United States Patent

Richardson et al.

[11] Patent Number: 5,845,468
[45] Date of Patent: Dec. 8, 1998

[54] ROTARY MOWER CUTTER DISC HAVING REPLACEABLE KNIFE MOUNT SHIELD

[75] Inventors: Craig Allen Richardson, Ottumwa; Allan Wesley Rosenbalm, Blakesburg; Michael Joseph Verhulst, Ottumwa, all of Iowa

[73] Assignee: Deere & Company, Moline, Ill.

[21] Appl. No.: 883,609

[22] Filed: Jun. 26, 1997

[51] Int. Cl.[6] .......................... A01D 75/30; A01D 34/66
[52] U.S. Cl. ........................ 56/6; 56/295; 56/DIG. 17; 56/DIG. 20; 56/503
[58] Field of Search ......................... 56/6, 255, 295, 56/503, 504, DIG. 17, DIG. 20

[56] References Cited

U.S. PATENT DOCUMENTS

| | | | |
|---|---|---|---|
| 3,581,482 | 6/1971 | Reber et al. | 56/295 |
| 3,665,692 | 5/1972 | Hughes | 56/295 |
| 3,762,138 | 10/1973 | Michael | 56/295 |
| 4,044,535 | 8/1977 | Alexandrino | 56/15.8 |
| 4,229,933 | 10/1980 | Bernard | 56/295 |
| 4,443,998 | 4/1984 | Neuerburg | 56/13.6 |
| 4,471,603 | 9/1984 | Veltin, Jr. | 56/295 |

Primary Examiner—Heather Shackelford

[57] ABSTRACT

A rotary mower cutter disc includes a replaceable knife mount shield which, in one embodiment, comprises a unitary slotted body which is received over the edge of the disc and held in place by the knife mounting bolt. The nut holding the bolt in place is located within a cylindrical cavity of the shield. In a second embodiment, the shield in made in two pieces mounted in sandwiching relationship to the mounting location of the disc having a back-turned lip defining a slot received over the edge of the disc and with the other piece being located on the side of the disc beside the lip and forming the cylindrical cavity for protecting the nut of the knife mounting bolt.

8 Claims, 2 Drawing Sheets

ROTARY MOWER CUTTER DISC HAVING REPLACEABLE KNIFE MOUNT SHIELD

BACKGROUND OF THE INVENTION

The present invention relates to rotary mowers and more specifically relates to cutter discs for such mowers.

The cutter units of a rotary cutterbar operate very close to the ground and include discs that rotate at a high rate of speed so that knives carried by the discs are able to impact-cut the crop. This combination of low location and high speed results in a high wear rate for the knives and discs. In addition, the knives are also damaged by contact with rocks and other obstacles. It is accepted practice to replace the knives on a regular basis due to wear. Knives are relatively low cost components and changing them is not difficult. Of more concern, because of its higher cost, is the disc itself which is subject to undue wear in the locations where the knives attach, particularly in abrasive soils, e.g., soils which contain sand.

Owners do not like to replace discs on a regular basis due to the cost and labor required. Accordingly, some discs are manufactured with inserts welded into the main disc body where the knives attach, e.g., see U.S. Pat. No. 3,581,482, issued 1 Jun. 1971 and U.S. Pat. No. 4,443,998, issued 24 Apr. 1984. These inserts form a cup for protecting the nut threaded onto the knife-attaching bolts and are thicker than the disc body and thus will run longer before wearing through. However, the labor involved in welding these inserts in place increases the cost of the disc.

SUMMARY OF THE INVENTION

According to the present invention, there is provided an improved disc structure for use with a rotary cutterbar, and, more particularly, there is provided an improved manner of protecting the cutter disc body at the areas which cutter knives are mounted.

An object of the invention is to provide a disc, for use with a rotary cutterbar, which has a disc body provided with knife mounting portions that are each easily repairable at an acceptable cost.

A more specific object is to provide a disc, as set forth in the immediately preceding object, wherein each knife mounting portion includes an easily replaceable shield that is attached to the disc body by a knife mounting bolt having a nut protected by the shield.

Still a more specific object of the invention is to provide a disc body with flat knife mounting sections and to reinforce each mounting section with either a one-piece shield provided with a slot receiving the mounting section, or with a two-piece shield having upper and lower segments disposed on opposite sides of the mounting section, the shield in each case being held in place by a blade mounting bolt extending through aligned mounting holes in the disc body and shield.

These and other objects will become apparent from a reading of the ensuing description together with the appended drawings.

DESCRIPTION OF THE PREFERRED EMBODIMENT

Figure 1:
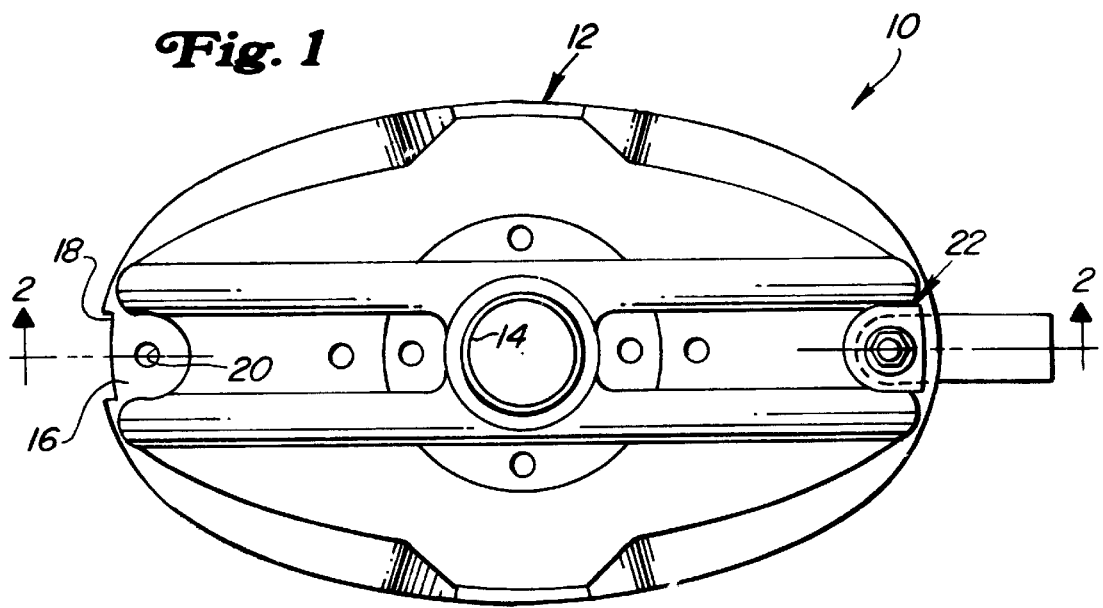
FIG. 1 is a top plan view of a rotary cutterbar disc showing one of its cutter knives and the associated replaceable shield.
Figure 2:
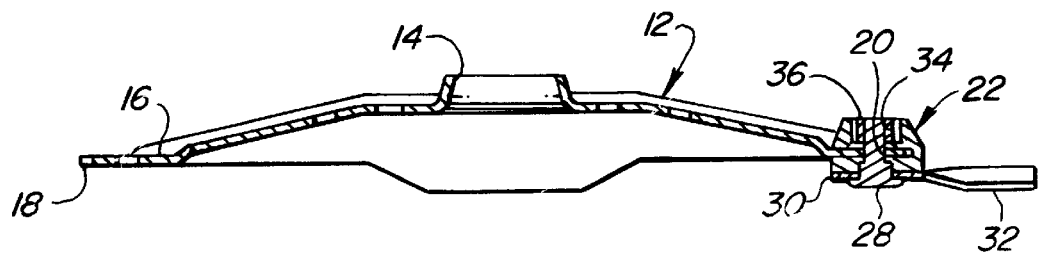
FIG. 2 is a vertical sectional view taken along line 2—2 of FIG. 1.

Referring now to FIGS. 1 and 2, there is shown a cutter disc assembly 10 which would be mounted, together with a plurality of like assemblies 10, along a cutterbar (not shown) forming a housing containing a gear train for rotating a plurality of upright drive shafts respectively associated with the cutter disc assemblies. The cutter disc assembly 10 comprises a disc body 12, which is oval shaped, as viewed from the top, and has a centrally located circular hole 14 for either permitting passage of an input drive shaft to the gear train contained in the cutterbar or for receiving the upper end of the drive shaft for the disc assembly. The disc body 12 includes a pair of flat, blade-mounting sections 16, respectively extending radially inwardly from diametrically opposite notches 18 at peripheral locations along a major axis of the disc body 12, the sections 16 each being horizontal in side view, i.e., disposed in a plane extending perpendicular to the axis of rotation of the disc body 12, and being within a generally u-shaped boundary, in top plan view, with the closed end of the boundary being semi-circular and disposed concentrically to a blade mounting hole 20 provided in the section 16. As will become apparent from the following description, the present invention could just as well be applied to cutter discs which utilize more than two blades, e.g., see U.S. Pat. No. 4,183,196, issued 15 Jan. 1980, or to discs or spiders having blade mounting sections which are inclined to the horizontal, e.g., see U.S. Pat. No. 3,716,973, issued 20 Feb. 1973.

Figure 3:
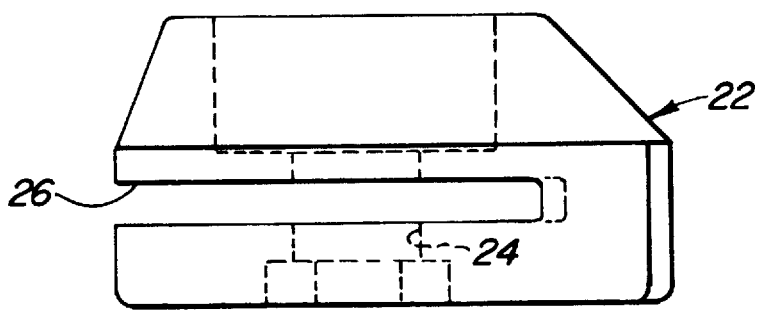
FIG. 3 is an enlarged side view of the replaceable shield illustrated in FIG. 1.
Figure 4:
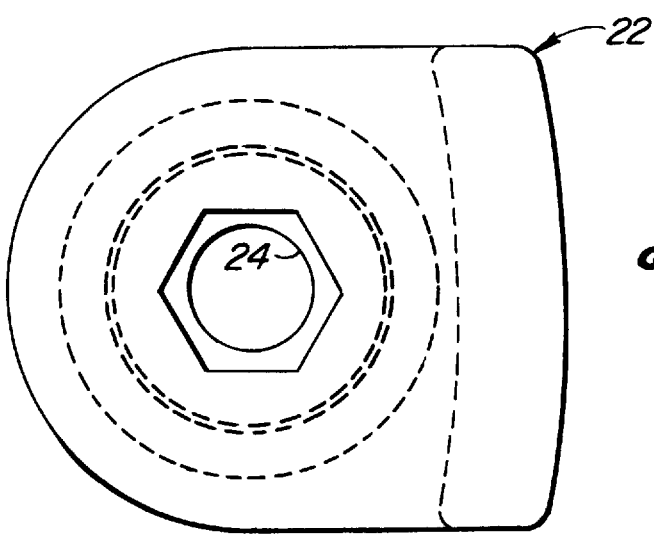
FIG. 4 is a bottom view of the shield shown in FIG. 3.

A pair (only one being shown installed) of identical, replaceable shields 22, forming the subject of the present invention, are respectively provided for reinforcing the disc body 12 in the vicinity of the blade-mounting sections 16. It is here noted that these shields 22 may be made of a high abrasion resistant material. With reference also to FIGS. 3 and 4, it can be seen that each shield 22, as viewed from either the top or bottom, as respectively shown in FIGS. 1 or 4, is shaped complementary to an associated mounting section 16. A bore 24 extends vertically through the shield 22 in concentric relationship to a semi-circular periphery of the shield, the bore 24 being traversed by a horizontal slot 26 provided in the shield so as to extend from the semi-circular periphery of the shield toward its opposite end at a height which leaves approximately one-third of the shield below and two-thirds of the shield above the slot, with these upper and lower portions of the shield being joined by an outer peripheral portion of the shield. The shield 22 is placed on the disc body 12 with the mounting section 16 being received in the slot 26 and the disc body hole 20 being aligned with the bore 24. The shield 22 is slightly narrower than the disc body notch 18, and the portion of the shield located outwardly of the slot 26 is received in the notch. A blade mounting bolt or fastener 28 defines a cylindrical portion 30 located adjacent a flat head of the fastener and on which a cutting blade 32 is mounted for free swinging movement. The bolt 28 extends upwardly through the bore 24 and the hole 20, the bore 24 having an enlarged upper portion defining a substantially cylindrical receptacle 34 receiving a nut 36 threaded onto an upper end of the fastener. For the purpose of preventing the bolt 28 from rotating relative to the shield 22 for ease in either tightening or loosening the nut 36 onto, or from, the bolt, the bore 24 has an enlarged bottom portion defining a hexagonal recess 38 and the bolt 28 has a complementary shaped portion 40, located adjacent the cylindrical portion 30, which is received in the recess 38.

Thus, it will be appreciated that the portion of the shield 22 located above the disc body 12 serves not only to protect the nut 36 but also serves to protect the upper surface of the flat disc body section 16 while the portion of the shield 22 located below the section 16 serves to protect the lower surface of the section, and the peripheral edge of the section is protected by the outer shield portion joining its upper and lower portions.

Figure 5:
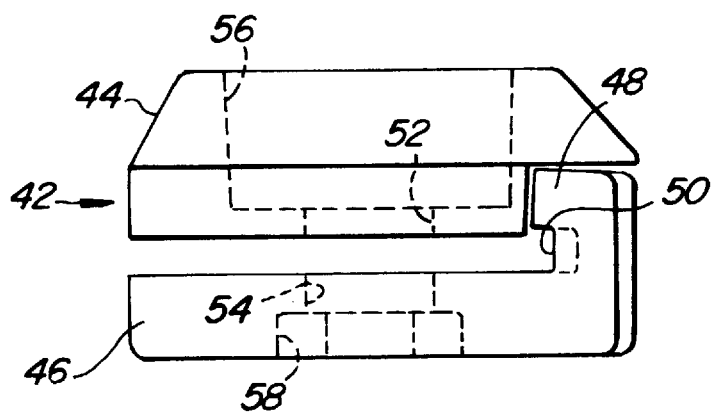
FIG. 5 is a side view like FIG. 3 but showing a two-piece shield.

Referring now to FIG. 5, there is shown a two-piece shield 42 which may be used as an alternate to the one-piece shield 22, described above. Specifically, while not shown here, the shield 42, as viewed from the top or bottom, has a shape similar to that of the shield 22. The shield 42 includes separate upper and lower segments 44 and 46, respectively, shown positioned here as they would be when installed on the disc body 12 with the upper and lower segments respectively engaged with the upper and lower surfaces of one of the blade mounting sections 16. For the purpose of protecting the outer edge of the associated mounting section 16 of the disc body 12, the lower segment 46 of the shield 42 includes a raised, back-turned lip 48 defining a groove 50 for receiving an edge portion of the section 16 defining the root or bottom of the notch 18. The upper and lower shield segments 44 and 46 are provided with respective bores 52 and 54 which, when the segments are installed on the disc body 12, are aligned with each other and with the blade mounting hole 20 of the associated disc body mounting section 16. The upper segment bore 52 has an enlarged upper end forming a generally cylindrical cavity 56 for receiving the nut 36 of an associated mounting bolt 28, while the lower segment bore 54 has an enlarged lower end defining a hexagonal recess 58 for receiving the complementary shaped portion of the associated mounting bolt 28.

Thus, it will be appreciated that the two-piece shield 42 performs exactly the same as the one-piece shield 22 in that it reinforces the associated mounting area 16 of the disc body 12 and is easily replaceable when worn. However, the shield 42 does afford the possibility that only one segment of the shield 42 may need to be replaced instead of the whole shield as would be the case of the one-piece shield 22 if any area thereof became too worn.

We claim:

1. In a cutter assembly, adapted for rotating about an upright axis passing centrally through the assembly, and including a cutter body having at least one flat, blade-mounting section extending radially inwardly toward said axis from a radially outward peripheral location of said body, containing only one mounting hole and having upper and lower surfaces, and a blade extending radially outwardly beyond the peripheral location and being secured to said cutter body solely by a bolt extending through the blade and said mounting hole and having a nut screwed thereon, the improvement comprising: a shield, separate from said blade and cutter body, having a bore aligned with said mounting hole and formed in upper and lower portions respectively engaging said upper and lower surfaces of said mounting section of said cutter body; and said upper portion of said shield including a cylindrical cavity receiving said nut.

2. The cutter assembly defined in claim 1 wherein said upper and lower portions of said shield are separate from each other, whereby said shield is constructed of two separate pieces.

3. The cutter assembly defined in claim 2 wherein one of said upper and lower portions of said shield has a lip integral with and back-turned in spaced relationship to a remainder of said one of said upper and lower portions of said shield so as to define a slot receiving a peripheral edge of said radially outward peripheral location of said cutter body.

4. The cutter assembly defined in claim 3 wherein said lower portion of said shield has said lip integral therewith.

5. The cutter assembly defined in claim 1 wherein said shield is constructed of one piece and is provided with a slot having said mounting section received therein.

6. The cutter assembly defined in claim 1 wherein said lower portion of said shield is provided with a non-circular recess forming a lower portion of said bore; and said bolt having a non-circular shank portion shaped complementary to and received in said recess, whereby the bolt is prevented from rotating relative to the shield.

7. The cutter assembly defined in claim 1 wherein a notch is provided in an outer peripheral edge of said mounting section of said cutter body; and said shield being received in said notch.

8. The cutter assembly defined in claim 1 wherein said cutter body is in the form of a disc and wherein said mounting section is located in a plane extending perpendicular to said axis.

* * * * *